United States Patent [19]
Keil

[11] 3,843,577
[45] Oct. 22, 1974

[54] SILOXANE-MODIFIED EPOXY RESIN COMPOSITIONS

[75] Inventor: Joseph W. Keil, Midland, Mich.

[73] Assignee: The Dow Chemical Company, Midland, Mich.

[22] Filed: Dec. 26, 1972

[21] Appl. No.: 318,149

[52] U.S. Cl.................. 260/29.1 SB, 260/33.6 EP, 260/33.6 SB, 260/33.8 EP, 260/33.8 SB, 260/37 SB, 260/37 EP, 260/824 R, 260/824 EP, 260/830 R

[51] Int. Cl...................... C08g 45/16, C08g 53/18
[58] Field of Search ................ 260/824 EP, 29.1 SB

[56] References Cited
UNITED STATES PATENTS

| | | | |
|---|---|---|---|
| 3,305,504 | 2/1967 | Huntington | 260/824 EP |
| 3,358,064 | 12/1967 | Belko | 260/824 EP |
| 3,511,788 | 5/1970 | Keil | 260/824 EP |
| 3,556,754 | 1/1971 | Marsden et al. | 260/824 EP |

Primary Examiner—Wilbert J. Briggs, Sr.
Attorney, Agent, or Firm—Norman E. Lewis

[57] ABSTRACT

Self-lubricated epoxy resins are obtained by molding and curing liquid polyepoxides containing diorganopolysiloxanes dispersed therein, uniform dispersions being formed with the aid of a siloxane copolymer of $SiO_2$ and $(CH_3)_3SiO_{1/2}$ units which has been modified by the inclusion of radicals derived from polyoxyethylene, polyoxypropylene or polyoxypropylene-polyoxyethylene copolymers.

13 Claims, No Drawings

SILOXANE-MODIFIED EPOXY RESIN COMPOSITIONS

The present invention relates to curable blends of epoxy resins and organopolysiloxanes. In one aspect, the invention relates to cured epoxy resins having modified surface properties. In another aspect, the invention relates to a cured epoxy resin composite which has self-lubricating properties.

Epoxy resins are well known for their valuable properties, such as chemical inertness, heat resistance, good adhesion and good electrical resistance. The polyepoxide resins are widely used as adhesives, encapsulating compounds and the like. When cast or molded, the cured epoxy resins exhibit a relatively high coefficient of friction. Other polymers, such as polytetrafluoroethylene, polyacetates and nylon, exhibit low coefficients of friction and find use in applications in which this self-lubrication characteristic is desirable. It would also be advantageous to increase to hydrophobicity and release characteristics of epoxy coatings and molding compounds. Because of the epoxy resin's chemical resistance, strength, and abrasion resistance, a polyepoxide material having improved surface characteristics would find use in a variety of new applications.

Thus, it is an object of the present invention to provide an epoxy resin composition which when cured exhibits a low coefficient of friction.

It is another object of the invention to provide a stable dispersion of a liquid epoxy resin and a fluid organopolysiloxane lubricant.

A further object of the invention is to provide an epoxy resin composition which, when cured, exhibits modified surface properties. These and other objects of the invention will be apparent to one skilled in the art upon reading the following disclosure and claims.

In accordance with the invention, there is provided a homogeneous dispersion comprising (a) from about 55 to 95 percent by weight of a curable epoxy resin composition; (b) from about 4 to 35 percent by weight of a fluid lubricant which is incompatible with the epoxy resin composition, the fluid having a viscosity in the range of 20 to 20,000,00 cs. at 25°C.; (c) from about 1 to 10 percent by weight of a dispersing agent capable of maintaining (b) dispersed in (a), the dispersing agent being a siloxane copolymer selected from the group consisting of (1) copolymers consisting essentially of $SiO_2$ units, $(CH_3)_3SiO_{1/2}$ units and $Q(CH_3)_2SiO_{1/2}$ units in which Q is a polyoxypropylene polymer, polyoxyethylene polymer, or a polyoxypropylenepolyoxyethylene copolymer radical having a molecular weight in the range of 500 to 6,000, Q being attached to the silicon atom via a silicon-carbon bond, the ratio of the $SiO_2$ units to the total $(CH_3)_3SiO_{1/2}$ and $Q(CH_3)_2SiO_{1/2}$ units being in the range of 1:04 to 1:1.2 and (2) copolymers which are reaction products derived from heating a mixture of a siloxane copolymer consisting essentially of $SiO_2$ units and $(CH_3)_3SiO_{1/2}$ units in which the ratio of $SiO_2$ units to $(CH_3)_3SiO_{1/2}$ units is in the range of 1:0.4 to 1:1.2, and a hydroxylated polyoxypropylene polymer, a hydroxylated polyoxyethylene polymer, or a hydroxylated polyoxypropylene-polyoxyethylene copolymer having a molecular weight in the range of 500 to 6,000.

As used herein "curable epoxy resin" is defined as an epoxide and a curing agent therefor. The epoxide may be saturated or unsaturated, cycloaliphatic, aromatic, heterocyclic or aliphatic, and may be substituted if desired with chlorine atoms, hydroxyl groups, ether radicals and the like. They may be monomeric or polymeric. The epoxy compounds have an average of more than one 1,2-epoxide group per molecule which may be present as an interior or terminal group. These epoxy resins which are liquid at room temperature are most preferred for utilization in the dispersions of the invention. Of course, normally solid resins can be used if the dispersion is formed at elevated temperatures or in the presence of a solvent.

Epoxy resins which may be used in these compositions include, for example, polyglycidyl esters, such as those obtainable by the reaction of di- or polycarboxylic acid with epichlorohydrin or glycerol dichlorohydrin in the presence of an alkali. Such polyglycidyl esters may be derived from aliphatic dicarboxylic acids, e.g., oxalic acid, succinic acid, glutaric acid, adipic acid, pimelic acid, suberic acid, azelaic acid, sebacic acid, or dimerised or trimersed linoleic acid, but are preferably derived from aromatic dicarboxylic acids such as phthalic acid, isophthalic acid, terephthalic acid, naphthalene-2,6-dicarboxylic acid, diphenyl-o,o'-dicarboxylic acid and ethylene glycol bis-(p-carboxyphenyl)ether. Such specific polyglycidyl esters, are for example, diglycidyl phthalate, diglycidyl adipate and those diglycidyl esters which correspond to the average formula:

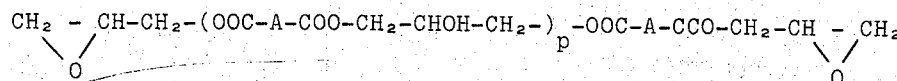
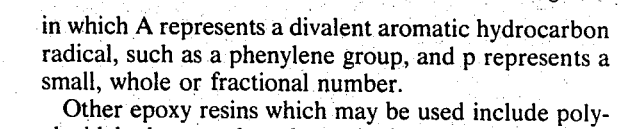

in which A represents a divalent aromatic hydrocarbon radical, such as a phenylene group, and p represents a small, whole or fractional number.

Other epoxy resins which may be used include polyglycidyl ethers, such as those obtainable by the interaction of a dihydric or polyhydric alcohol or a dihydric or polyhydric phenol with epichlorohydrin or a related substance (for example, glycerol dichlorohydrin) under alkaline conditions or, alternatively, in the presence of an acidic catalyst with subsequent treatment with alkali. These compounds may be derived from diols or polyols, such as ethylene glycol, diethylene glycol, triethylene glycol, propane-1,2-diol, propane-1,3-diol, butane-1,4-diol, pentane-1,5-diol, hexane-1,6-diol, hexane-2,4,6-triol, glycerol or N-aryldialkanolamines such as N-phenyldiethanolamine, or preferably, from dihydric or polyhydric phenols such as resorcinol, catechol, hydroquinone, 1,4-dihydroxynaphthalene, 1,5-dihydroxynapthalene, bis(4-hydroxyphenyl)methane, bis(4-hydroxphenyl)methylphenylmethane, bis(4,hydroxyphenyl)-tolylmethanes, 4,4'-dihydroxydiphenyl, bis(4-hydroxyphenyl)sulphone and, especially, 2,2-bis(4-hydroxyphenyl)propane or phenolformaldehyde condensation products.

There may further be employed aminopolyepoxides such as are, for example, obtained by the dehydrohalogenation of the reaction products of epihalohydrins and primary or disecondary amines such as aniline, n-butyl-amine or bis(4-methylaminophenyl)methane, and products obtained by the partial or complete epoxidation of cyclic or acyclic polyolefins.

Especially suitable epoxy resins are those obtained from 2,2-bis(4-hydroxyphenyl)propane which have an epoxide content of about 3.8 to 5.88 epoxide equivalents per kilogram.

As curing agents to be used in the epoxy resin compositions of the present invention there may be mentioned those conventionally employed as cross-linking agents for epoxy resins, for example amines containing at least two hydrogen atoms directly attached to nitrogen, e.g., aliphatic and aromatic primary and secondary amines such as mono- and di-butylamine, p-phenylenediamine, bis(p-aminophenyl)methane, ethylenediamine, N,N-diethyl-ethylenediamine, diethylenetriamine, tetra(hydroxyethyl)diethylenetriamine, triethylene-tetramine, tetraethylenepentamine, piperidiene, guanidine, and guanidine derivatives, such as phenylguanidine and diphenylguanidine, dicyandiamide, anilineformaldehyde resins, polymers of aminostyrenes, and polyamino-amides, e.g., those prepared from aliphatic polyamines and dimerised or trimerised unsaturated fatty acids; isocyanates and isothiocyanates; polyhydric phenols, e.g., resorcinol, hydroquinone, 2,2-bis (4-hydroxyphenyl)propane, phenolaldehyde resins and oil-modified phenol-aldehyde resins; reaction products of aluminum alkoxides or phenolates with tautomeric-reacting compounds of the acetoacetic ester type; Friedel-Crafts catalysts, e.g., $AlCl_3$, $SnCl_4$, $ZnCl_2$, $BF_3$, and their complexes with organic compounds; phosphoric acid; and polycarboxylic acids and their anhydrides, e.g., phthalic anhydride, methylendimethylenetetrahydrophthalic anhydride, dodecenylsuccinic anhydride, hexahydrophthalic anhydride, hexachloroendomethylenetetrahydrophthalic anhydrides or endomethylenetetrahydrophthalic anhydrides, or their mixtures, or maleic or succinic anhydrides.

There may also be used catalytic hardeners, e.g., tertiary amines such as 2,4,6-tris(dimethylaminomethyl) phenol, triethanolamines, or N-benzyldimethylamines, alkali metal alkoxides of alcohols such as 2,4-dihydroxy-3-hydroxy-methylpentane; stannous salts of alkanoic acids, such as stannous octoate; aluminum alkoxides; and triphenylphosphine.

The fluid lubricant component of the dispersion is incompatible with the epoxy resin composition. If compatible lubricants were used, one would obtain a solution rather than a dispersion and the resin would be plasticized by the lubricant. In the dispersion of the invention, the lubricant is dispersed as discrete particles throughout the epoxy phase and when the resin is cured, the fluid lubricant is then available to perform its function of reducing the coefficient of friction.

As a general rule, the polar lubricants, such as the polyethers, are solvated by epoxy resins and are not useful in the practice of the invention. Suitable fluid lubricants include paraffinic and mixed base mineral oils of lubricating oil viscosity, for example those having a viscosity range of from 50 SUS at 100°F to 250 SUS at 210°F; polymerized olefins, such as polypropylene and polybutene; chlorofluorocarbon oils, such as the linear polymers of recurring $-CF_2CFCl-$ units; and organopolysiloxane lubricants such as dimethylpolysiloxane.

The useful fluid organopolysiloxane lubricants are of the general formula $R_aSiO_{4-a/2}$ wherein $a$ has a value of 2 or 3 and can be represented as hydroxyl-endblocked linear polymers or as polymers of the formula $R_3SiO+R_2SiO+_nSiR_3$. Each R is independently selected from the group consisting of the hydrogen atom; lower alkyl radicals such as the methyl, ethyl, butyl and hexyl groups; the phenyl radical and the 3,3,3-trifluoropropyl radical. Illustrative of such organopolysiloxanes are $(CH_3)_3SiO$ $[(CH_3)_2SiO]_{20}Si(CH_3)_3$, $(CH_3)_3SiO$ $[(CH_3)C_6H_5SiO]_{15}$-$Si(CH_3)_3$, $(CH_3)_2C_6H_5SiO$ $[CF_3CH_2CH_2(CH_3)SiO]_{20}Si(CH_3)_2C_6H_5$, $(CH_3)_3SiO[H(CH_3)SiO]_{35}Si(CH_3)_3$, $(CH_3)_3SiO[(CH_3)C_3H_7SiO]_2$-$[(CH_3)_2SiO]_{35}Si(CH_3)_3$ and $HO+(CH_3)_2SiO+_{12}H$.

Although the higher viscosity siloxanes are operable in the practice of the invention, it is sometimes necessary to use a solvent in forming the dispersion. Thus, it is preferred to utilize the lower viscosity materials; i.e., those having a viscosity of less than 20,000 cs. at 25°C, because of the ease with which they can be dispersed in the epoxy resin.

The third component of the composition of the invention functions to maintain discrete particles of the fluid lubricant (b) dispersed throughout the epoxy resin (a). Two types of siloxane copolymers have been found which will serve this purpose. One of these copolymers consists essentially of $SiO_2$ units, $(CH_3)_3SiO_{1/2}$ units and $Q(CH_3)_2SiO_{1/2}$ units wherein Q is a polyoxypropylene polymer, a polyoxyethylene polymer, or a polyoxypropylene-polyoxyethylene copolymer radical having molecular weights in the range of 500 to 6,000, Q being attached to the silicon atom via a silicon-carbon bond, and the ratio of the $SiO_2$ units to the total $(CH_3)_3SiO_{1/2}$ and $Q(CH_3)_2SiO_{1/2}$ units is in the ranage of 1:0.4 to 1:1.2. The other known operable copolymer is the reaction product obtained by heating a mixture of a siloxane copolymer consisting essentially of $SiO_2$ units and $(CH_3)_3SiO_{1/2}$ units in which the ratio of the $SiO_2$ units to the $(CH_3)_3SiO_{1/2}$ units is in the range of 1:0.4 to 1:1.2, and a hydroxyl containing polyoxypropylene polymer, a hydroxylated polyoxyethylene polymer, or a hydroxyl containing polyoxypropylene-polyoxyethylene copolymer having molecular weights in the range of 500 to 6,000.

The first copolymer is best prepared by cohydrolyzing and condensing a mixture of $(CH_3)_3SiCl$, $H(CH_3)_2SiCl$ and $SiCl_4$ and then coupling an allyloxy ended polyoxyalkylene polymer thereto with the aid of a platinum catalyst. For those unfamiliar with this preparation attention is directed to U.S. Pat. No. 3,511,788, particularly examples 5 and 6, for details.

The second copolymer, which is preferred, is made simply by heating a mixture of the two ingredients for about two hours at reflux, preferably in the presence of a siloxane condensation catalyst such as potassium hydroxide or tin octoate. In this case it is theorized that the residual hydroxyl groups on the silicon atoms in the siloxane condense with the hydroxyl groups of the polyoxyalkylene polymer to form a silicon-oxygen-carbon bond between the two reactants.

The dispersions of the invention can be prepared by simply mixing the three components in the correct proportions. The lubricant can be weighed into a container with the dispersing agent then being stirred in with the epoxy resin being added to the stirred mixture. If the resin is solid at room temperature, the mixture can be heated. Solvents for the resin or high viscosity fluids can be used in preparing the dispersion and can be removed by heating the mixture. If the curing agents or catalytic hardeners or the epoxy resin composition are active at room temperature or at the temperatures utilized in preparing the dispersion, such materials should be added just prior to molding or casting the composition.

The fluid lubricant (b) and dispersing agent (c) are added in amounts in the stated ranges, but the optimum amounts will be determined by the end use of the cured composite article. There is a sacrifice of physical strength as greater amounts of lubricant are added. More than 35 weight percent fluid lubricant can be dispersed in the resin but there is no corresponding increase in surface lubricity. The nature of lubricant and the amount of dispersing agent will determine the size of the dispersed fluid particles. Generally, the particle size is in the range of from 0.5 to 25 microns, although particles as small as 1,000 A. have been observed.

Various types of inert pigments and fillers may be incorporated in the above-described epoxy dispersions. Weatherability of coatings or articles formed from the dispersions can be improved by adding small amounts of the $(CH_3)_3SiO_{1/2}$-$SiO_2$ copolymer described in U.S. Pat. No. 2,676,182. Exemplary of solid inorganic particulate fillers are talc, diatomaceous earth, silica aerogel, alumina, mica, asbestos and the like. Suitable pigments include titanium oxide, carbon black and nonreactive organic coloring materials. The amount of filler or pigment added to the dispersion will vary with the end use of cured resin article, but in no case should the filler content be so great that the particles do not remain suspended in the dispersion. Hydrated alumina particles have been added in amounts up to 140 parts by weight per 100 parts of the dispersion of the invention without rendering the dispersion unstable. Conventional additives, such as flame retardants, plasticizers, antioxidants, antichalking agents and the like can also be utilized.

The epoxy dispersion can be cast or molded and then cured by conventional methods. The epoxy compositions of the invention can also be used to impregnate glass cloth in the preparation of laminates or as coatings on various substrates, such as metal, wood, stone, paper and the like.

When cured, either at room temperature or by heating depending on the hardener system, the dispersions of the invention provide a rigid epoxy resin matrix containing discrete particles of the fluid lubricant dispersed therein. These particles can be considered as approximately spherical, uniformly distributed throughout the matrix, ranging in size from about 0.5 to 25 microns and containing a mixture of the lubricant and dispersing agent. This composite article exhibits surface lubricity and hydrophobicity. Because the lubricant is dispersed throughout the matrix, these properties are retained in the face of abrasion or erosion and the composite article is easily machined to any desired shape.

Thus, composite articles comprising a cured epoxy resin matrix containing uniformly dispersed therein discrete fluid particles, the fluid consisting essentially of a mixture of about 30 to about 95 weight percent of a fluid lubricant which is incompatible with the epoxy resin in its uncured state, the remainder of the mixture being a siloxane copolymer selected from the group consisting of (1) copolymers consisting essentially of $SiO_2$ units, $(CH_3)_3SiO_{1/2}$ units and $Q(CH_3)_2SiO_{1/2}$ units in which Q is a polyoxypropylene polymer or a polyoxypropylene-polyoxyethylene copolymer radical having a molecular weight in the range of 500 to 6,000, Q being attached to the silicon atom via a silicon-carbon bond, the ratio of the $SiO_2$ units to the total $(CH_3)_3SiO_{1/2}$ and $Q(CH_3)_2SiO_{1/2}$ units being in the range of 1:0.4 to 1:1.2 and (2) copolymers which are reaction products derived from heating a mixture of a siloxane copolymer consisting essentially of $SiO_2$ units and $(CH_3)_3SiO_{1/2}$ units in which the ratio of $SiO_2$ units to $(CH_3)_3SiO_{1/2}$ units is in the range of 1:0.4 to 1:1.2, and a hydroxylated polyoxypropylene polymer or a hydroxylated polyoxypropylene-polyoxyethylene copolymer having a molecular weight in the range of 500 to 6,000; are within the scope of the present invention. The fluid particles comprise from about 5 to about 45 weight percent of the cured composite article.

As with the dispersions, fillers and pigments can be present in the composite article. Filled composites containing hydralated alumina are especially useful as insulators for high voltage transmission systems. Bearing members and gears fabricated from this composite material have special utility in devices requiring some degree of permanent lubrication.

The following examples are illustrative and not to be construed as limiting the invention delineated in the claims.

EXAMPLE 1

A copolymeric dispersant was obtained by heating at reflux for four hours a mixture of 100 parts of a 50 percent solids xylene solution of a siloxane copolymer consisting essentially of $SiO_2$ units and $(CH_3)_3SiO_{1/2}$ units in which the ratio of $SiO_2$ to $(CH_3)_3SiO_{1/2}$ was in the range of 1:0.4 to 1:1.2, 200 parts of xylene and 200 parts of a hydroxylated polyoxypropylene having a molecular weight of 4100. Previous to reaction the $SiO_2$-$(CH_3)_3SiO_{1/2}$ copolymer solution had been bodied by heating in the presence of a small amount (0.01 percent) KOH to reduce the hydroxyl content of the copolymer.

The above dispersant was mixed with various amounts of fluid organopolysiloxane lubricants and the xylene was removed by stripping. After thoroughly mixing the lubricant and dispersant, a curable epoxy composition was added and the materials were mixed in a Brookfield counter rotating mixer. A homogeneous dispersion was readily formed. The epoxy composition consisted of 65 parts of a cycloaliphatic monomer of the formula

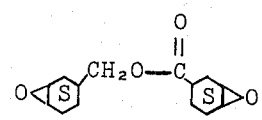

having a viscosity of 350 to 450 cps at 25°C. and epoxide equivalent of from 131 to 143; 71.5 parts of hexahydropthalic anhydride (hardener) and 7.8 parts of a commercially available organometallic accelerator (Ciba-065). Various amounts of the epoxy composition were added to samples of the lubricant-dispersant mixtures.

The dispersions were formed by shear mixing and cast in molds conforming to lubricant wear testing blocks with 0.155 in² of contact area. The cast dispersions were gelled for 1-2 hours at 85°-95° and cured for 3 to 20 hours at 120°C. The self-lubricating characteristics of the cured composite materials were determined by using the LFW-1 test machine as described in U.S. Pat. No. 3,028,746. The specific dispersion compositions and results of lubrication testing are given in the table below:

| Lubricant Composition | Epoxy | Dispersion Composition (weight percent) | | Run Time (min.) | Lubrication Test Data and Conditions (LFW-1 Test) | | |
|---|---|---|---|---|---|---|---|
| | | Lubricant | Dispersant | | R.P.M.(*) | Load lbs. | Coefficient of Friction ($\mu$) |
| none present | 100 | — | — | 14 | 400 | 30 | 0.43 (sample melted) |
| dimethylpolysiloxane (1000 cs.) | 85.8 | 9.5 | 4.7 | 36 | 200 | 30–90 | 0.07–0.20 |
| do. | 76.2 | 18.5 | 5.3 | 44 | 400 | 30 | 0.19 |
| do. | 59.7 | 30.0 | 10.3 | 35 | 400 | 30 | 0.10 |
| dimethylpolysiloxane (100 cs.) | 76.2 | 18.5 | 5.3 | — | 200 | 30–120 | 0.13–.20 |

(*) 0.36 ft./rev.

These data demonstrate that the cured composites of the invention exhibit a significant reduction in coefficient of friction as compared to the unmodified epoxy resin. This self lubrication compares quite favorably with unmodified nylon which has a coefficient of friction of about 0.3.

EXAMPLE 2

Triethylenetetra-amine catalyst (0.53 grams) was added to five grams of a mixture containing 10 parts of copolymeric dispersant of Example 1, 35 parts of dimethylpolysiloxane (1000 cs. viscosity) and 65 parts of diglycidyl ether of bisphenol A (epoxide equivalent weight of 187–193). After shear mixing, the dispersion was deaired under 29 mm. Hg. vacuum. The dispersion was cast and allowed to cure at room temperature, then post cured at 100°C. for 2 hours. The cured composites exhibited a coefficient of friction of 0.05–0.07 when tested in the manner described in Example 1.

EXAMPLE 3

About seven drops of potassium hydroxide was added to a mixture of 33 grams of a siloxane copolymer consisting essentially of $SiO_2$ units and $(CH_3)_3SiO_{1/2}$ units as described in Example 1 and 67 grams of a hydroxylated polyoxyethylene polymer having a molecular weight of 4000. The mixture was solvated with 100 grams of xylene. The catalyzed solution was heated at reflux for 9.5 hours after which the hydroxyl-condensation was deemed complete and stripped of solvent.

One gram of the above reaction product was melted and added to three grams of trimethylsiloxy-terminated polydimethylsiloxane having a viscosity of 1000 cs. at 25°C. The dispersant-lubricant combination was mixed with 7 grams of uncatalyzed epoxy (diglycidyl ether of bisphenol A-epoxide equivalent weight of 187–193) in a high shear mixer. The resultant dispersion was a white composition which did not cream or separate after 18 hours at 100°C. Microscopic examination (50X) showed the fluid to be uniformly dispersed as very small individual droplets.

When catalyzed with triethylenetetra-amine and allowed to cure at room temperature, the above dispersion will yield a composite article, the surface of which has release characteristics. Such a material is especially useful in fabricating printing rollers from which ink is easily released.

EXAMPLE 4

The epoxy resin of Example 1 was added to the copolymeric dispersant of Example 1 and a lubricant in various proportions and mixed under shear conditions to form the following dispersions:

No. 1 - 79.1 wt. percent epoxy resin
    19.2 wt. percent trimethylsiloxy-terminated dimethylpolysiloxane (1000 cs.)
    1.7 wt. percent dispersant copolymer
No. 2 - 76.2 wt. percent epoxy resin
    18.5 wt. percent trimethylsiloxy-terminated dimethylsiloxane (1000 cs.)
    5.3 wt. percent dispersant copolymer
No. 3 - 76.2 wt. percent epoxy resin
    18.5 wt. percent siloxane lubricant of the formula $(CH_3)_3SiO\ CH_3(H)SiO\ _{35}\ Si(CH_3)_3$ having a viscosity of 30 cs.
    5.3 wt. percent dispersant copolymer Finely divided hydrated alumina was mixed with these dispersions under high shear. About 107 parts alumina per 100 weight parts of dispersion No. 1 gave a stable filler dispersion, while 137 parts per hundred were added to dispersions No. 2 and No. 3. The filled dispersions were press molded in the form of slabs and cured at 80°–90°C. for 1-2 hours, with post cure of 16–20 hours at 120°C.

The filled composites were tested in accordance with ASTM Test Method 2303–64T (Inclined Plane Test) to determine their suitability as insulating materials for high voltage transmission systems. Results are given below:

| Filled Dispersion | Track Time | Comments |
|---|---|---|
| No. 1 | > 680 minutes | No tracking, terminated test after 680 minutes, very slight erosion |
| No. 2 | > 1000 minutes | No tracking, terminated test after 1000 minutes, very slight erosion |
| No. 3 | > 730 minutes | terminated after 730 minutes, track of ½" × ½" × 1/16" deep. |

In addition to the arc track resistance demonstrated above, the composite materials show excellent suppression of leakage current under wet conditions because of their durable hydrophobic surfaces.

EXAMPLE 5

A variety of lubricants were utilized in forming dispersions within the scope of the invention. In all cases the dispersion contained 76.2 wt. percent of the epoxy resin of Example 1, 5.3 wt. percent of the copolymeric dispersant of Example 1 and 18.5 wt. percent of a lubricant. The specific lubricants are listed below:

No. 1 — paraffinic mineral oil having a viscosity of 429 SUS at 100°F.

No. 2 — polyisobutylene lubricant

No. 3 — trimethylsilyl-terminated 3,3,3-trifluoropropylmethylpolysiloxane having a viscosity of 1000 cs. at 25°C.

No. 4 — trimethylsilyl-terminated siloxane copolymer of dimethylsiloxy units and phenylmethylsiloxy units containing about 10 mol percent phenyl-substituted siloxy units and having a viscosity of about 500 cs. at 25°C.

No. 5 — trimethylsilyl-terminated siloxane copolymer of about 80 mol percent ethylmethylsiloxy units and about 20 mol percent 2-phenylpropyl(methyl)siloxy units having a viscosity of about 1,400 cs. at 25°C.

No. 6 — trimethylsilyl-terminated siloxane copolymer of about 50 mol percent dimethylsiloxy units and 50 mol percent phenylmethylsiloxy units having a viscosity of about 1,000 cs. at 25°C.

A seventh dispersion was formed by mixing 4.5 wt. percent of paraffinic mineral oil, 4.5 weight percent of the dispersant and 90 weight percent of the epoxy resin. All of the dispersions were formed by mixing under shear conditions. In all cases, stable homogeneous dispersions were obtained.

These dispersions were cast and cured in accordance with the procedure set forth in Example 1. The cured composite articles exhibited self-lubricating properties.

Reasonable modification and variation are within the scope of the present invention which is directed to novel epoxy resin dispersions and cured articled formed therefrom.

That which is claimed is:

1. A homogeneous polymeric dispersion comprising
   a. 55 to 95 weight percent of a curable epoxy resin composition, said epoxy resin having an average of more than one 1,2-epoxide group per molecule;
   b. 4 to 35 weight percent of a fluid lubricant which is incompatible with the epoxy resin composition, said fluid having a viscosity in the range of 20 to 20,000,000 cs. at 25°C.;
   c. 1 to 10 parts weight percent of a dispersing agent capable of maintaining (b) dispersed in (a), said dispersing agent being a siloxane copolymer selected from the group consisting of
      1. copolymers consisting essentially of $SiO_2$ units, $(CH_3)_3SiO_{1/2}$ units and $Q(CH_3)_2SiO_{1/2}$ units in which Q is a polyoxypropylene polymer, a polyoxyethylene polymer, or a polyoxypropylene-polyoxyethylene copolymer radical having a molecular weight in the range of 500 to 6,000, Q being attached to the silicon atom via a silicon-carbon bond, the ratio of the $SiO_2$ units to the total $(CH_3)_3SiO_{1/2}$ and $Q(CH_3)_2SiO_{1/2}$ units being in the range of 1:0.4 to 1:1.2 and
      2. copolymers which are reaction products derived from heating a mixture of a siloxane copolymer consisting essentially of $SiO_2$ units and $(CH_3)_3SiO_{1/2}$ units in which the ratio of $SiO_2$ units to $(CH_3)_3SiO_{1/2}$ units is in the range of 1:0.4 to 1:1.2, and a hydroxylated polyoxypropylene polymer, a hydroxylated polyoxyethylene polymer, or a hydroxylated polyoxypropylene-polyoxyethylene copolymer having a molecular weight in the range of 500 to 6,000.

2. A dispersion in accordance with claim 1 wherein the dispersing agent (c) is a copolymeric reaction product derived from heating a siloxane copolymer consisting essentially of $SiO_2$ units and $(CH_3)_3SiO_{1/2}$ units in which the ratio of $SiO_2$ units to $(CH_3)_3SiO_{1/2}$ units is in the range of 1:0.4 to 1:1.2, and a hydroxylated polyoxyalkylene polymer having a molecular weight in the range of 500 to 6,000, said polyoxyalkylene polymer being selected from the group consisting of hydroxylated polyoxypropylene polymers, hydroxylated polyoxyethylene polymers and polyoxypropylene-polyoxyethylene copolymers.

3. A dispersion in accordance with claim 2 wherein the reaction product is derived from heating said siloxane copolymer and a hydroxylated polyoxypropylene polymer having a molecular weight in the range of 500 to 6,000.

4. A dispersion in accordance with claim 1 wherein the fluid lubricant is an organopolysiloxane.

5. A dispersion in accordance with claim 4 wherein the organopolysiloxane lubricant is dimethylpolysiloxane.

6. A dispersion in accordance within claim 4 wherein the organopolysiloxane has a viscosity of not greater than 20,000 cs. at 25°C.

7. A dispersion in accordance within claim 1 which contains a solid inorganic particulate filler.

8. A dispersion in accordance within claim 7 wherein the filler comprises hydrated alumina.

9. A composite article comprising a cured epoxy resin matrix containing uniformly dispersed therein discrete fluid particles, the fluid consisting essentially of a mixture of about 30 to 95 weight percent of a fluid lubricant which is incompatible with the epoxy resin in its uncured state, said epoxy resin having an average of more than one 1,2-epoxide group per molecule, the remainder of the mixture being a siloxane copolymer selected from the group consisting of
   1. copolymers consisting essentially of $SiO_2$ units, $(CH_3)_3SiO_{1/2}$ units and $Q(CH_3)_2SiO_{1/2}$ units in which Q is a polyoxypropylene polymer, a polyoxyethylene polymer, or a polyoxypropylene-polyoxyethylene copolymer radical having a molecular weight in the range of 500 to 6,000, Q being attached to the silicon atom via a silicon-carbon bond, the ratio of the $SiO_2$ units to the total $(CH_3)_3SiO_{1/2}$ and $Q(CH_3)_2SiO_{1/2}$ units being in the range of 1:0.4 to 1:1.2 and
   2. copolymers which are reaction products derived from heating a mixture of a siloxane copolymer consisting essentially of $SiO_2$ units and $(CH_3)_3SiO_{1/2}$ units in which the ratio of $SiO_2$ units to $(CH_3)_3SiO_{1/2}$ units is in the range of 1:0.4 to 1:1.2, and a hydroxylated polyoxypropylene polymer, a hydroxylated polyoxyethylene polymer, or a hydroxylated polyoxypropylene-polyoxyethylene copolymer having a molecular weight in the range of 500 to 6,000, the fluid particles ranging in size from 0.1 to 20 microns and comprising from about 5 to 45 weight percent of the composite article.

10. A composite article in accordance with claim 9 wherein the fluid lubricant is an organopolysiloxane.

11. A composite article in accordance with claim 10 wherein the organopolysiloxane is dimethylpolysiloxane having a viscosity of not greater than 20,000 cs. at 25°C.

12. A composite article in accordance with claim 9 which contains a solid inorganic filler.

13. A composite article in accordance with claim 12 wherein the filler comprises hydrated alumina.

* * * * *

UNITED STATES PATENT AND TRADEMARK OFFICE
CERTIFICATE OF CORRECTION

PATENT NO. : 3,843,577
DATED : October 22, 1974
INVENTOR(S) : JOESPH W. KEIL

It is certified that error appears in the above-identified patent and that said Letters Patent are hereby corrected as shown below:

In the heading, "The Dow Chemical Company" should be deleted and --Dow Corning Corporation-- inserted. The assignment for this patent was recorded on Reel 3075, Frames 306-307 on April 29, 1974 to Dow Corning Corporation.

Signed and Sealed this sixth Day of January 1976

[SEAL]

Attest:

RUTH C. MASON
Attesting Officer

C. MARSHALL DANN
Commissioner of Patents and Trademarks